US006538044B2

(12) United States Patent
Ledniczky et al.

(10) Patent No.: US 6,538,044 B2
(45) Date of Patent: Mar. 25, 2003

(54) FRAGRANCED LACQUER COATING AND PROCESS FOR PREPARATION THEREOF TO BE SCREEN PRINTED

(76) Inventors: Mária Pálfi née Ledniczky, Amfiteátrum u.20, H-1031 Budapest (HU); Tamás Jermakov, Kékgolyó, u.1/b., H-Budapest (HU)

(*) Notice: Subject to any disclaimer, the term of this patent is extended or adjusted under 35 U.S.C. 154(b) by 0 days.

(21) Appl. No.: 09/949,570

(22) Filed: Sep. 11, 2001

(65) Prior Publication Data

US 2002/0082313 A1 Jun. 27, 2002

Related U.S. Application Data

(63) Continuation-in-part of application No. 09/445,540, filed on Dec. 8, 1999, now abandoned.

(51) Int. Cl.⁷ .............................. C08F 2/50; C08K 5/00; C08L 67/07; A61K 7/46
(52) U.S. Cl. ..................... 522/46; 522/74; 522/107; 512/1; 512/4
(58) Field of Search ............... 522/107, 46, 74; 512/1, 4

(56) References Cited

U.S. PATENT DOCUMENTS

| | | | | |
|---|---|---|---|---|
| 4,161,570 A | * | 7/1979 | Lee et al. ..................... 521/53 |
| 4,722,865 A | * | 2/1988 | Huizer ........................ 428/407 |
| 4,761,435 A | * | 8/1988 | Murphy et al. ................ 522/46 |
| 4,885,319 A | * | 12/1989 | Dougherty et al. ............ 522/31 |
| 5,407,666 A | * | 4/1995 | Patel et al. .................... 424/61 |
| 5,837,745 A | * | 11/1998 | Safta et al. ..................... 522/8 |
| 6,028,124 A | * | 2/2000 | Glover et al. ................ 522/181 |

FOREIGN PATENT DOCUMENTS

| EP | 0 322 808 | * | 7/1989 |
|---|---|---|---|
| FR | 1 493 743 | * | 9/1967 |
| JP | 01045471 A | * | 2/1992 |

OTHER PUBLICATIONS

RAPI–CURE Vinylethers, "Reactive Agents for Radiation Curing Systems", pp. 5, 10, 17, Apr. 1999.*

* cited by examiner

*Primary Examiner*—Susan W. Berman
(74) *Attorney, Agent, or Firm*—Keil & Weinkauf

(57) ABSTRACT

Fragranced lacquer coating composition polymerized by ultraviolet (UV) (UV-A from 315 to 380 nm) radiation comprising
  a) 70 to 90 parts by weight unsaturated polyester acrylate,
  b) 5 to 20 parts by weight divinylether monomer,
  c) 3 to 10 parts by weight UV photoinitiator,
  d) 1 to 10 parts by weight fragrance and
  e) 0.01 to 0.1 parts by weight odorless additive having fluidifying properties. The invention also relates to the preparation of the foregoing lacquer coating.

6 Claims, No Drawings

FRAGRANCED LACQUER COATING AND PROCESS FOR PREPARATION THEREOF TO BE SCREEN PRINTED

This application is a continuation-in-part of application Ser. No. 09/445,540, filed Dec. 8, 1999, now abandoned

FIELD OF THE INVENTION

The present invention relates to a fragranced lacquer coating based on an unsaturated polyester acrylate prepolymer in a mixture of polymerizable divinylether monomer, ultraviolet (UV) photoinitiator, and process for preparation thereof.

BACKGROUND OF THE INVENTION

The process of fragrance coating by offset procedure of microencapsulated fragrances is known, but that method is limited to a layer thickness of maximum 3 μm, and thus the fragrance content is less than 8% (w/w) of the coating composition. This lacquer contains fragrance in relatively low concentration. Another inconvenience of this method is the fact that generally used binding material has odor which sometimes disguises the original fragrance.

Another process of fragrance coating is known, i.e., fragrance dispersion into acryl dispersed phase. The disadvantage of this process is that a high water content (from 50 to 60% by weight) of the mixture enables printing on particularly thick paper of more than 100 g/m². This flexo-procedure allows limited coating amount comprising of low fragrance content due to the danger of spontaneous coagulation.

DESCRIPTION OF RELATED ART

The following references disclose compositions comprising a fragrance, but do not describe coating compositions comprising a vinyl ether component in combination with an unsaturated polyester.

JP 01045471 A (J'471) discloses a fragrant resin film prepared by photopolymerizing cyclodextrin and a perfume in a liquid resin comprising a (meth)acrylated oligomer or unsaturated polyester oligomer, a reactive diluent and a photoinitiator. The film is used to give an aroma to cards, posters, etc., by printing onto a substrate.

Safta et al. describe free radical UV radiation curable polish compositions which comprise an unsaturated polyester, monomers or oligomers having (meth)acrylate or vinylether functional groups, a photoinitiator (such as benzophenone) and a fragrance.

FR 1 493 743 discloses resin compositions containing a perfume, an unsaturated polyester and styrene and ethylmethacrylate as reactive diluents.

Photopolymerizable compositions comprising unsaturated polyesters, vinylether monomers and photoinitiators are known in the art.

Murphy et al. (U.S. Pat. No. 4,761,435) describe polyamine-polyene ultraviolet curable coating compositions. Unsaturated polyesters, a vinylether such as diethyleneglycol divinylether and preferably a polytertiary amine resin including ethylenic unsaturation which is polyester are used, polymerization is initiated by an aryl ketone such as benzophenone.

EP 0 322 808 discloses a coating composition comprising unsaturated polyester and vinylether monomers which are cured by EB or by UV in the presence of photoinitiators at a rage of 20 feet per minute in air.

Dougherty et al. (U.S. Pat. No. 4,885,319) describe a blend of divinylether and their use as diluents for irradiation curable resins.

Trade literature "RAPI-CURE Vinylethers" describes that: (1) vinylethers combine excellent application properties with low toxicity in comparison to other diluents; (2) vinylethers may be used with most oligomer types, especially epoxides, acrylate and unsaturated polyesters, (3) free radical reactions with acrylate monomers and oligomers.

BRIEF SUMMARY OF THE INVENTION

We found a process based on a liquid, unsaturated polyester in prepolymerization state. Coating in the art and polymerized lacquer allows a slow, retarded elimination of fragrance by membrane diffusion. The real advantage of the named process is unlimited concentration and type of fragrance (synthetic and/or natural).

DETAILED DESCRIPTION OF THE INVENTION

The object of the present invention is a fragranced lacquer coating polymerized by UV (UV-A, from 315 to 380 nm) radiation comprising
 a) 70 to 90 parts by weight unsaturated polyester acrylate,
 b) 5 to 22 parts by weight divinylether monomer,
 c) 3 to 10 parts by weight UV photoinitiator,
 d) 1 to 10 parts by weight fragrance and
 e) 0.01 to 0.1 parts by weight odorless additive having fluidifying properties.

The sum of the amounts a+b+c being 100, d+e are premixed and then added in an amount to obtain a properly fragranced lacquer to be coated by UV radiation at temperatures of from 20 to 30°C.

As polyester base (a) can be utilized unsaturated, for instance amine-modified polyester acrylates, preferably polyester having an aliphatic chain, where the carbon atom number is less than 20.

Unsaturation of polyesters may derive from a) ethylenically unsaturated groups, such as allyl, vinyl and styryl unsaturation, and/or b) polymerizable unsaturated acidic part, such as maleic, fumaric, cinnamic esters. These unsaturated polyesters are useful alone or in combination with other unsaturated reactive components, such as acrylates, preferably containing nonvolatile compounds. The amine-modified unsaturated polyester acrylates are commercially available product, such as Ebecryl 80 (UCB Chemicals, Belgium) including an appropriate amine compound and/or group to minimize oxygen inhibition and thus, tender the coatings rapidly curable on exposure to i UV radiation in the presence of air.

For polymerization and crosslinking as an odorless monomer, divinylether (b), preferably triethylene glycol divinylether and diethylene glycol divinylether, can be utilized.

The good hardness and adhesion of coating is due to crosslinking polymerization. This three-dimensional polymer is able to retard fragrances, as the coatings described in this invention.

As UV photoinitiator, benzophenone derivatives can be used, by-products of which are preferably odorless.

Different fragrances can be used, the invention enables utilizing fragrances of both synthetic and natural origin. Their slight influence on polymerization process must be taken into consideration, therefore, the concentration of each component may vary and trial polymerization is recommended.

An additive is used to improve the aesthetic appearance of the coated material and fluidifying properties of the coat. The fluidifying properties of the coat include the viscosity and surface tension characteristics that allow it to be applied to surfaces as adherent and thin film. Preferably used additives are, for instance, colloidical silica, odorless reactive double unsaturated polyester, fluoroaliphatic polymeric esters.

The process according to the present invention can be carried out by dissolving the vinylether monomer in the liquid unsaturated polyester, then the initiator and the premixed additive and fragrance are added at room temperature (from 20 to 30° C.), homogenization with continuous mixing and avoiding UV light. The homogeneous, viscous liquid is coated in a layer from 4 to 20 µm and radiated from 1 to 10 seconds.

In order to avoid overheating due to the infrared component of the UV radiation emitted from mercury vapor UV lamps commonly used for polymerizing, one can utilize UV lamps having a reduced infrared emission or place a filter eliminating most of the infrared radiation to avoid overheating of printed material to more than 40° C.

This invention discloses a new type of fragranced lacquer coat, especially useful in screen printing. The fragrance in this composition can be varied in concentration and printed easily. The printed materials have a decorative lacquer and smells.

EXAMPLE 1

A paper (without own smell) of 100 g/m$^2$ was coated by spreading with a layer of 10 µm a mixture containing 80 parts by weight polyester-acrylate, 11 parts by weight triethylene glycol divinylether, 9 parts by weight UV photoinitiator, a benzophenone derivative, then 4 parts by weight of rose oil and 0.02 parts by weight fluidifying additive. The formulation was polymerized with one 80 w/cm UV lamp (utilizing a cold water flow) at a feeding rate of 10 m/min.

EXAMPLE 2

A paper (without own smell) of 100 g/m$^2$ was coating by spreading with a layer of 10 µm of a mixture containing 85 parts by weight polyester acrylate, 10 parts by weight diethylene glycol divinylether, 5 parts by weight UV initiator, a benzophenone derivative, then 6 parts by weight synthetic lily fragrance and 0.01 parts by weigh fluidifying additive. The formulation was polymerized with one 80 W/cm UV lamp (utilizing a cold water flow) at a feeding rate of 10 m/min.

What is claimed is:

1. Fragranced lacquer coating composition polymerized by ultraviolet (UV) (UV-A from 315 to 380 nm) radiation comprising a) 70 to 90 parts by weight unsaturated polyester acrylate,
   b) 5 to 20 parts by weight divinylether monomer,
   c) 3 to 10 parts by weight UV photoinitiator,
   d) 1 to 10 parts by weight fragrance and
   e) 0.01 to 0.1 parts by weight odorless additive having fluidifying properties.

2. Fragranced lacquer coating composition according to claim 1, which comprises a) 80 to 85 parts by weight unsaturated polyester acrylate,
   b) 9 to 15 parts by weight divinyl ether monomer,
   c) 4 to 10 parts by weight UV photoinitiator,
   d) 1 to 6 parts by weight natural and/or synthetic fragrance, and
   e) 0.01 to 0.1 parts by weight odorless additive having fluidifying properties.

3. Fragranced lacquer coating composition according to claim 1, wherein unsaturated polyester acrylate is amine-modified polyester acrylate.

4. Fragranced lacquer coating composition according to claim 1, wherein the UV photoinitiator is a benzophenone derivative having odorless by-product at polymerization.

5. A process for coating a subatrate with the fragranced lacquer according to claim 1, wherein coating is carried out by dissolving the vinylether monomer in the liquid unsaturated polyester acrylate, then initiator and the premixed additive and fragrance are added at room temperature (from 20 to 30° C.), homogenized with continuous mixing and avoiding UV light, the obtained homogeneous, viscous liquid is coated in a layer from 4 to 20 µm, and irradiated with uv light from 1 to 10 seconds.

6. The process according to claim 5, wherein infared emissions are reduced by utilizing mercury vapor lamps as UV radiation source having power of from 80 to 100 W/cm and having a reduced infrared emission or by utilizing a filter to eliminate most infrared radiations or by utilizing flow water cooling to avoid overheating of printed material to more than 40° C.

* * * * *

UNITED STATES PATENT AND TRADEMARK OFFICE
CERTIFICATE OF CORRECTION

PATENT NO.    : 6,538,044 B2
DATED         : March 25, 2003
INVENTOR(S)   : Ledniczky et al.

It is certified that error appears in the above-identified patent and that said Letters Patent is hereby corrected as shown below:

<u>Title page,</u>
Item [57], ABSTRACT,
Line 7, "I to 10" should be -- 1 to 10 --.

Signed and Sealed this

Second Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,538,044 B2
DATED         : March 25, 2003
INVENTOR(S)   : Ledniczky et al.

It is certified that error appears in the above-identified patent and that said Letters Patent is hereby corrected as shown below:

<u>Title page,</u>
Insert Item:
-- [30]   Foreign Application Priority Data
        June 11, 1997   (Hu) …………………...P9701033 --
Item [57], ABSTRACT,
Line 7,   "I to 10" should be -- 1 to 10 --.

This certificate supersedes Certificate of Correction issued September 2, 2003.

Signed and Sealed this

Thirtieth Day of December, 2003

JAMES E. ROGAN
*Director of the United States Patent and Trademark Office*